Nov. 14, 1939. W. S. GURTON ET AL 2,180,048
AUTOMATIC SEMITRAILER POWER HOIST CONNECTION WITH TRUCK POWER UNIT
Filed Feb. 16, 1938 2 Sheets-Sheet 1

Inventors
William S. Gurton
Joseph Plint
Herman Nyberg

Inventors
William S Gurton
Joseph Plint
Herman Nyberg

Patented Nov. 14, 1939

2,180,048

UNITED STATES PATENT OFFICE 2,180,048

AUTOMATIC SEMITRAILER POWER HOIST CONNECTION WITH TRUCK POWER UNIT

William S. Gurton, Joseph Plint, and Herman Nyberg, Kitchener, Ontario, Canada, assignors to Dominion Truck Equipment Company Limited, Kitchener, Ontario, Canada Application February 16, 1938, Serial No. 190,764

7 Claims. (Cl. 180—14)

The principal objects of this invention are to eliminate the objectionable features incident to the maintenance of flexible hose connections between a hydraulic pump carried on the truck and a hydraulic hoist arranged upon the trailer and to provide a power connection between the truck power unit and a hydraulic pump carried on the trailer which will be automatically connected and disconnected with the coupling and uncoupling of the trailer to and from the truck.

The principal feature of the invention consists in the novel arrangement of a hydraulic pump unit upon a trailer having a shaft mounted horizontally in bearings in the "fifth wheel" structure adapted to engage in a slidable interlocking driving connection with a shaft operatively connected with the power unit of the truck.

In the accompanying drawings

In large semi-trailer structures equipped with "dump" bodies it is customary to operate the pivotal body by means of a hydraulic "hoist" comprising a cylinder and piston which is mounted on the trailer frame and in most of these structures the fluid pressure for operating the hoist is conveyed to the hoist by means of high pressure flexible hose connected to a suitable hydraulic pump mounted on the truck and operated by the power plant of the truck.

It will be readily understood that the use of hose connections for such service is a constant source of trouble and expense through breakage and leakage and always uncertain coupling connections and uncoupling of the trailer from the truck results in considerable oil loss.

These difficulties have been recognized and several forms of "power drive fifth wheel" structures have been devised in which the power is conveyed by a vertical shaft extending through a hollow king pin. These structures involve complicated details which it is desirable to avoid.

Figure 1:
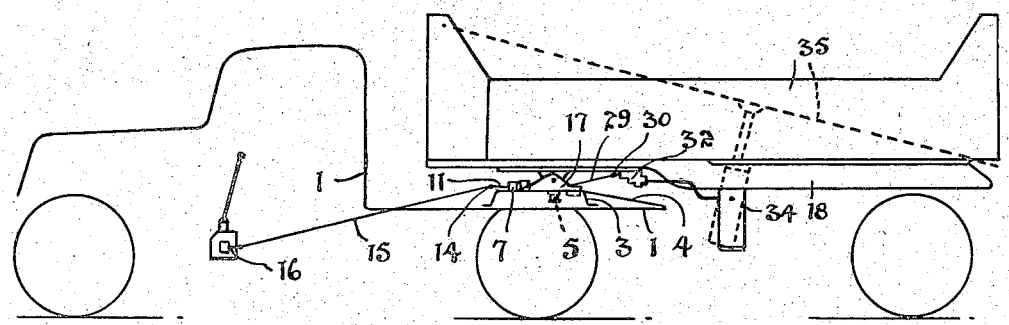
Figure 1 is a diagrammatic elevational view of a truck and semi-trailer unit illustrating the application of the present invention.
Figure 2:
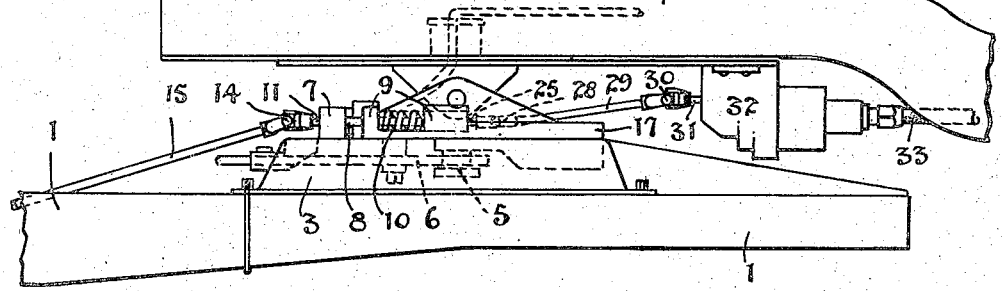
Figure 2 is a side elevational view of the "fifth wheel" connection between the truck and trailer.
Figure 3:
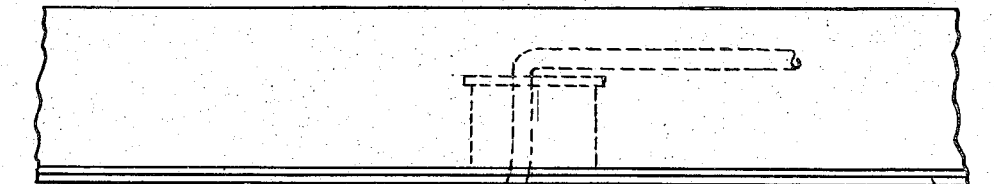
Figure 3 is an enlarged part longitudinal midsectional view of the "fifth wheel" structure showing the separable drive shaft connection.
Figure 3:
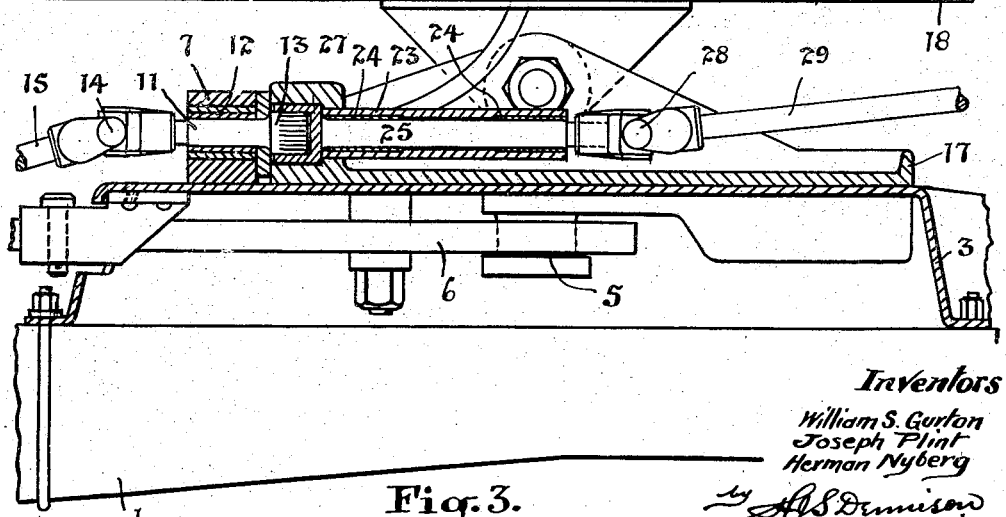
Figure 4:
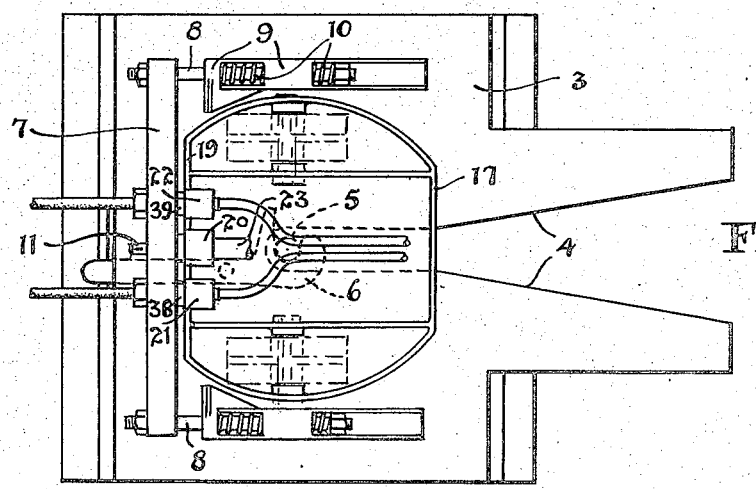
Figure 4 is a plan view of the "fifth wheel" structure coupled as illustrated in Figure 2.
Figure 5:
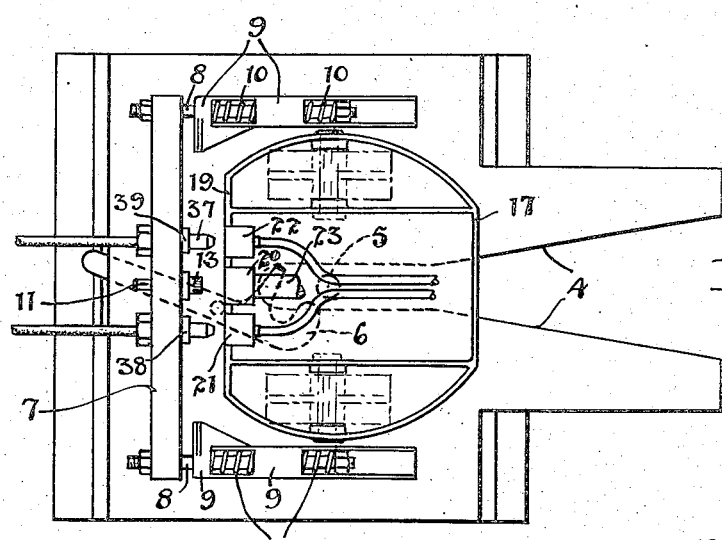
Figure 5 is a plan view of the "fifth wheel" structure shown uncoupled.
Figures 6, 7:
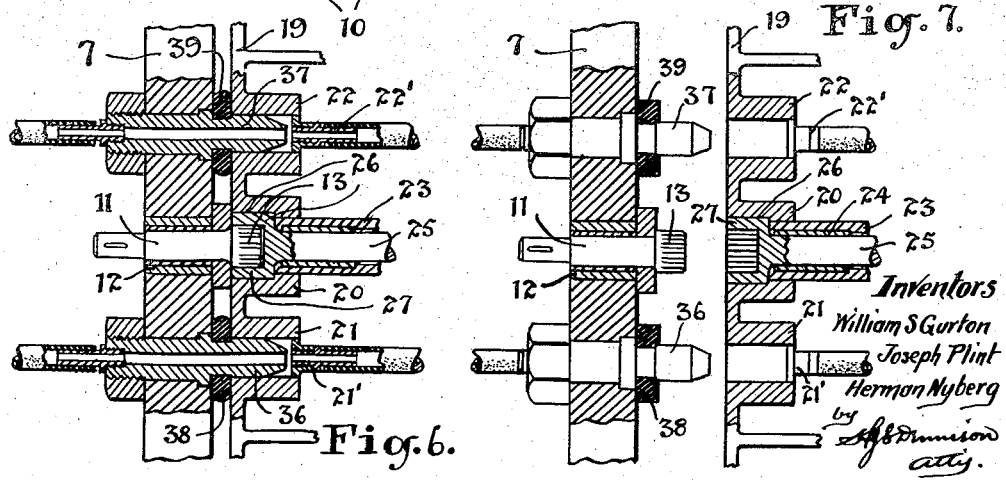
Figure 6 is an enlarged horizontal sectional detail of the drive connection and the associated brake connections shown in their coupled relation.
Figure 7 is a view similar to Figure 6 showing the drive and brake connections in an uncoupled position.

In the present device, the truck 1 has mounted on the rear end of its frame 2, the fifth wheel base 3 provided with a converging guide way 4 to guide the king pin 5 of the trailer into its central position where it is engaged by the lock hook 6, shown in dotted lines in Figures 4 and 5.

A buffer bar 7 is mounted at the ends on bars 8 slidably supported in the parallelly arranged brackets 9 at either side of the base 3, said bars 8 being cushioned by compression springs 10.

A stub shaft 11 is journalled in a bearing 12 arranged centrally of the length of the bar 7 and it is formed with a longitudinally splined rear end 13 extending beyond the bar 7. A universal joint 14 is keyed on the forward end of the shaft 11 and said joint is connected to a shaft 15 which extends forwardly and is suitably connected and driven from a "power take off" 16 connected with the power plant of the truck.

The upper fifth wheel member 17 pivotally mounted on the trailer frame 18 is formed with a transverse forward bar 19 provided with a centrally arranged boss 20 and bosses 21 and 22 arranged either side thereof. A tubular member 23 is rigidly mounted in the boss 20 and it is provided with journal bearings 24 at either end.

A shaft 25 is rotatably mounted in the bearings 24 in the member 23 and it has formed at its forward end, and housed in a recess 26 in the boss 20, a splined socket member 27 adapted to receive and interlock in driving engagement with the splined end 13 of the shaft 11.

A universal coupling 28 is secured to the rear end of the shaft 25 and a shaft 29 is connected to said coupling and extends rearwardly and has mounted on its other end a universal coupling 30 which is connected to the shaft 31 of the hydraulic pump 32 mounted on the frame of the trailer.

The pump 32 is connected by the flexible hose connections 33 with the hydraulic cylinder of the hoist 34 which is suitably mounted in the trailer frame to raise and lower the hinged "dump" body 35.

The bosses 21 and 22 have mounted therein the brake hose couplings 21' and 22' which are connected in a suitable manner to the trailer brake equipment. Connector nozzles 36 and 37 are mounted on the buffer bar 7 to extend into the bosses 21 and 22 and rubber sealing bushings 38 and 39 surround the nozzles when the buffer bar is in the locked position. The nozzles 36 and 37 are connected to a suitable braking fluid supply on the truck.

In coupling the trailer and truck, the king pin 5 is guided into place as described and as the transverse bar 19 of the upper "fifth wheel" member moves into place the splined end 13 of the shaft 11 enters the splined socket member 27 of the shaft 25. Simultaneously the air hose nozzles 36 and 37 enter the bosses 21 and 22 and the connections are completed against the spring resistance of the buffer bar as the king pin is locked and the hydraulic pump mounted on the trailer is thereby automatically connected through the shafts and connections described with the "power take off" on the truck. The operator of the vehicle may then operate the dump body from the truck through a positive mechanical drive to the hydraulic pump.

A device such as described is very simple and obviates the difficulties and dangers incident to carrying the high pressure oil through flexible piping requiring to be frequently coupled and uncoupled.

What we claim as our invention is:

1. In a semi-trailer power hoist connection, the combination with a truck having a "fifth wheel" base and a resiliently mounted buffer bar mounted thereon and a trailer having a "fifth wheel" member adapted to engage said buffer bar, of a power driven shaft journalled in said buffer bar and extending rearwardly thereof, a shaft journalled in said trailer "fifth wheel" member to align with said power driven shaft, hoist-actuating mechanism mounted on said trailer and connected to the latter shaft, and means forming a sliding interlocking connection between said latter shaft and the rearward extension of the power driven shaft.

2. In a semi-trailer power hoist connection, the combination with a truck having a "fifth wheel" base and a resiliently mounted buffer bar mounted thereon and a trailer having a "fifth wheel" member adapted to engage said buffer bar, of a power driven shaft journalled in said buffer bar and having a splined end projecting rearwardly beyond said bar, a shaft journalled in said trailer "fifth wheel" member to align with the aforesaid shaft and having a splined socket to receive the splined end of said shaft, a hydraulic pump mounted on said trailer and connected with the shaft journalled in the "fifth wheel" member, and a power "take off" connected with the shaft journalled in said buffer bar.

3. In a semi-trailer power hoist connection the combination with a truck having a "fifth wheel" base and a resiliently mounted buffer bar mounted thereon and a trailer having a "fifth wheel" member adapted to engage said buffer bar, of a shaft journalled in said buffer bar, a "power take off" on said truck, a flexible shaft connection between said "take off" and said shaft, a shaft journalled in said trailer "fifth wheel" member to align with the shaft journalled in the buffer bar, a hydraulic pump mounted on the trailer, a flexible shaft connection between said hydraulic pump and the shaft journalled in the fifth wheel, and means forming a sliding interlock between the adjoining ends of said aligned shafts.

4. In a semi-trailer power hoist connection, the combination with a truck having a "fifth wheel" base and a resiliently mounted buffer bar mounted thereon provided with projecting brake tube connections and a trailer having a "fifth wheel" member adapted to engage said buffer bar and having sockets to receive said brake tube connections, of a shaft journalled midway between said brake tube connections, a "power take off" on said truck, flexible shaft connections between said "power take off" and the aforesaid shaft, a shaft journalled midway between said brake tube sockets on said "fifth wheel" member, a hydraulic pump mounted on the trailer, flexible shaft connections between said latter shaft and said pump, and a sliding interlocking connection between the ends of the shafts mounted respectively in said buffer bar and said "fifth wheel" member.

5. In a semi-trailer power connection, the combination with the tractor power unit and a mechanism to be operated thereby mounted on the trailer, of a shaft mounted on the tractor for rotation and longitudinal displacement relative thereto and operatively connected with the power unit, a second shaft, means mounting said second shaft for rocking displacement about an axis extending transversely of said trailer, means for automatically coupling said respective shafts on the relative coupling displacement of the tractor and trailer, means for resiliently opposing longitudinal displacement of said tractor-mounted shaft whereby damage due to shock impact on coupling will be minimized, and means flexibly operatively connecting said second mentioned shaft with said trailer-mounted mechanism.

6. In a semi-trailer power connection, the combination with the truck power unit and a mechanism to be operated thereby mounted on the trailer, of a shaft rotatably mounted on the truck, and operatively connected with the power unit, a second shaft, means mounting said second shaft for rocking displacement about an axis extending transversely of said trailer, means for automatically coupling said respective shafts on the relative coupling displacement of the truck and trailer, and means flexibly operatively connecting said second-mentioned shaft with said trailer-mounted mechanism, said first-mentioned shaft being mounted in a buffer member cushioned for fore and aft shock displacement.

7. In a semi-trailer power connection, the combination with a truck power unit and a mechanism to be operated thereby mounted on the trailer, of a shaft mounted on the trailer and connected with said mechanism, a power-driven shaft mounted on the truck to axially align with the trailer shaft, means for directly operatively coupling said shaft only when the shafts have been axially aligned, and telescoping members carried respectively by the truck and trailer and inter-engageable prior to engagement of the shaft members to ensure axial alignment of said shaft members and prevent damage of the engaging portions of the shaft due to misalignment.

WILLIAM S. GURTON
JOSEPH PLINT.
HERMAN NYBERG.